(12) United States Patent
Joshi et al.

(10) Patent No.: US 8,165,581 B2
(45) Date of Patent: Apr. 24, 2012

(54) SELECTIVE CHANNEL SCANNING FOR NETWORKED DEVICES

(75) Inventors: Anupam Joshi, Kirkland, WA (US); Ratheesh Rajan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 971 days.

(21) Appl. No.: 12/109,344

(22) Filed: Apr. 25, 2008

(65) Prior Publication Data

US 2009/0270091 A1 Oct. 29, 2009

(51) Int. Cl.
*H04Q 7/20* (2006.01)
(52) U.S. Cl. .................. 455/434; 370/338
(58) Field of Classification Search .......... 455/434, 455/435.2
See application file for complete search history.

(56) References Cited

U.S. PATENT DOCUMENTS

| | | | |
|---|---|---|---|
| 6,011,960 A * | 1/2000 | Yamada et al. .............. 455/77 |
| 7,146,130 B2 | 12/2006 | Hsu et al. | |
| 7,193,975 B2 | 3/2007 | Tsutsumi et al. | |
| 7,224,970 B2 | 5/2007 | Smith et al. | |
| 7,289,828 B2 | 10/2007 | Cha et al. | |
| 2002/0082010 A1 * | 6/2002 | Koorapaty et al. .......... 455/434 |
| 2003/0118015 A1 | 6/2003 | Gunnarsson et al. | |
| 2004/0259546 A1 | 12/2004 | Balachandran et al. | |
| 2005/0107088 A1 | 5/2005 | Oura | |
| 2005/0153692 A1 | 7/2005 | Hwang et al. | |
| 2006/0221914 A1 | 10/2006 | Waxman | |
| 2007/0070960 A1 * | 3/2007 | Barak et al. ................ 370/338 |
| 2007/0237121 A1 | 10/2007 | Khandelwal et al. | |

OTHER PUBLICATIONS

Lee, et al., "Performance of an Efficient Method for Association Admission Control in Public Wireless Lan Systems", IEEE Vehicular Technology Conference No. 60, Los Angeles CA, ETATS-UNIS (2004), pp. 5049-5053.
Youssef, et al., "The Horus WLAN Location Determination System", MobiSys '05 Technical Program, 3rd International Conference on Mobile Systems, Applications, and Services, Dated: 2005, 31 Pages, http://www.usenix.org/publications/library/proceedings/mobisys05/tech/full_papers/youssef/youssef_html/.

* cited by examiner

*Primary Examiner* — Dwayne Bost
*Assistant Examiner* — Joseph Dean, Jr.

(57) ABSTRACT

Selectively scanning available channels for a network connection. A computing device defines a preferred channel list for a network along with a scan ratio. The scan ratio relates the frequency that the preferred channels are scanned versus the frequency that all the channels are scanned. In an embodiment, the preferred channel list reflects channels on which the computing device has recently connected. Employing the scan ratio thereby balances power consumption with fast connection establishment. The scan ratio is also adjustable to affect power consumption and battery life of the computing device.

17 Claims, 8 Drawing Sheets ated with the computing device 102. In an embodiment, preferred channels correspond to those channels that have a higher likelihood of hosting a connection.

SELECTIVE CHANNEL SCANNING FOR NETWORKED DEVICES

BACKGROUND

Many existing computing devices have network adapters configured for network communication. The use of the wireless connection by applications executing on the computing devices is increasing. For example, electronic mail applications, stock service applications, news application, and other applications require frequent network access to maintain current data. For mobile computing devices having wireless network access, such constant use of the wireless network connection increases power consumption thereby reducing battery life. Further, when the mobile computing device exits a network coverage area, the device performs repeated sequential channel scans to find networks available for connection. That is, existing computing devices sequentially and repeatedly scan a list of available channels until a connection is available. This scanning requires a substantial amount of power. The chances of connecting to a network sooner are greater if the device scans frequently. However, frequent scans have increased power requirements that in turn lead to reduced battery life.

SUMMARY

Embodiments of the invention enable a computing device to intelligently scan available channels for connection to a network. A preferred list of channels is defined along with a scan ratio relating the quantity of scans of channels on the preferred list of channels to a quantity of scans of all the available channels. For example, the preferred list of channels reflects the channels on which the computing device recently connected to a particular network. A communication interface of the computing device performs the scanning in accordance with the preferred list of channels and the scan ratio.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
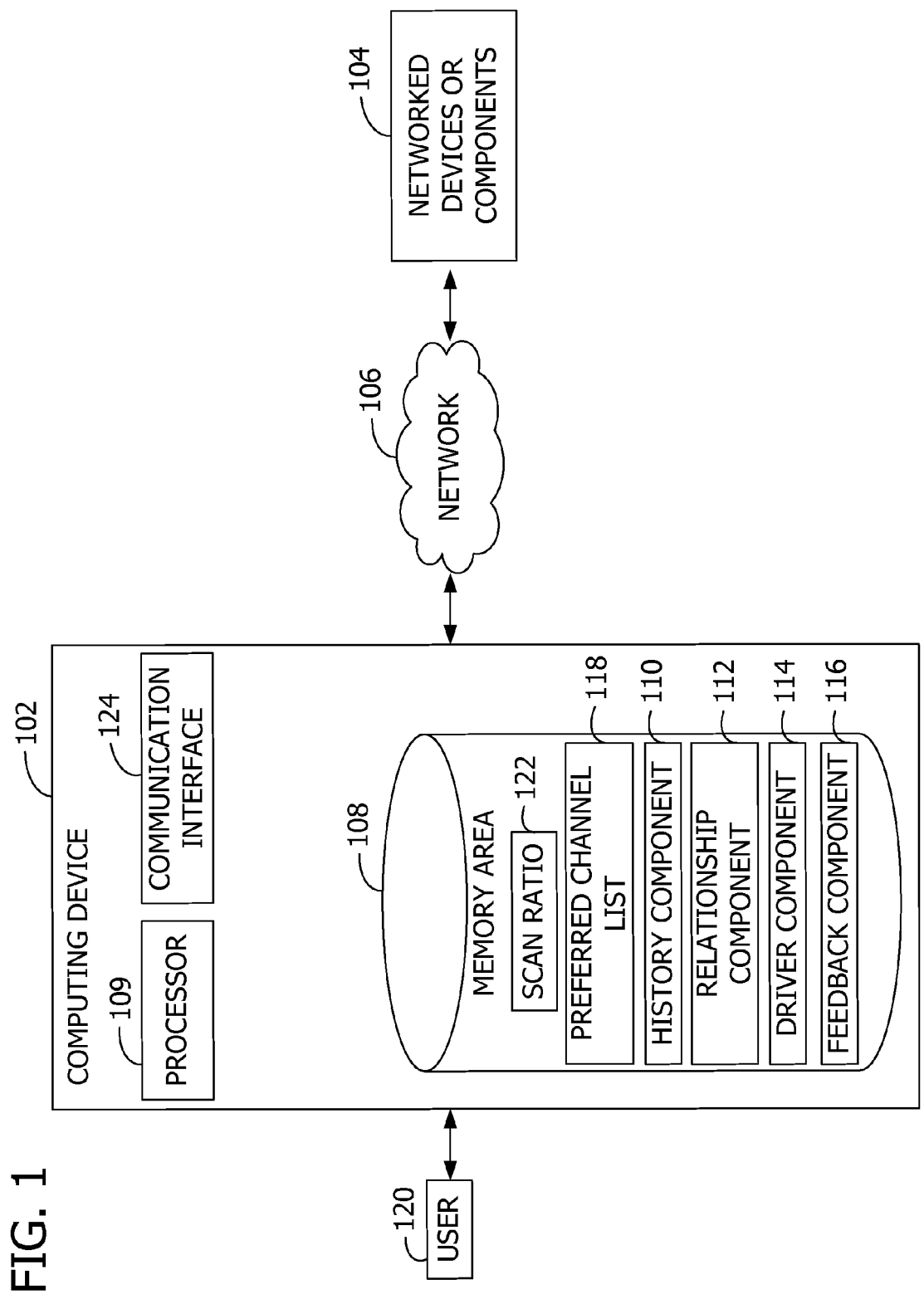
FIG. 1 is an exemplary block diagram illustrating communication between a computing device and other networked devices or components via a network.

Referring first to FIG. 1, embodiments of the invention enable selective scanning of available channels for connection by a computing device 102 to a network 106 to balance scanning frequency with power consumption. By preferentially scanning one or more of the channels as contemplated herein, the computing device 102 manages power consumption while connected or unconnected to the network 106. For example, performing shorter scans (e.g., fewer channels) at a defined interval or performing the shorter scans more frequently than the defined interval affects the life of a battery associated with the computing device 102. In an embodiment, preferred channels correspond to those channels that have a higher likelihood of hosting a connection.

Referring again to FIG. 1, an exemplary block diagram illustrates communication between the computing device 102 and other networked devices or components 104 via the network 106. The other networked devices or components 104 include, for example, servers, mobile computing devices (e.g., wireless devices such as mobile telephones), routers, gaming consoles, and any other networked device or component. The computing device 102 has one or more computer-readable media such as a memory area 108 associated therewith. The memory area 108 stores computer-executable components for implementing aspects of the invention. A processor 109 associated with the computing device 102 executes the components. The components include, for example, a history component 110, a relationship component 112, a driver component 114, and a feedback component 116. The history component 110 creates and maintains a list of channels that have a higher likelihood of hosting a network connection. The list of channels maintained by the history component 110 represents a preferred channel list 118. For example, the history component 110 may maintain a list of channels on which the computing device 102 has previously connected to the network 106 by tracking the channels to which the computing device 102 has connected over a defined time period. The history component 110 uses this information to update the preferred channel list 118. A user 120 may also explicitly configure channels as preferred channels for inclusion in the preferred channel list 118. In some embodiments, the preferred channel list 118 represents a subset of a plurality of the channels available for connection.

In an embodiment, the history component 110 maintains the channels by adding and removing channels. Upon each connection to the network 106, the history component 110 determines if the channel used to connect is present in the preferred channel list 118. If not, the history component 110 adds the current channel to the preferred channel list 118 and assigns one or more expiration criteria. The expiration criteria include any criterion for determining when to remove a particular channel from the preferred channel list 118. For example, channels that have been inactive for a defined period of inactivity (e.g., one week) are removed from the preferred channel list 118 by the history component 110 or other channel maintenance task. Such a task executes periodically to check the expiration criteria for each channel and updates the preferred channel list 118 by removing channels that have expired. If the current channel is already present in the preferred channel list 118, the history component 110 updates the expiration criteria (e.g., resets a timer).

Alternatively or in addition, the history component 110 removes channels based on geographic location of the computing device 102. For example, channels associated with a particular geographic location are removed when the computing device 102 is located outside the particular geographic location for a defined period of time.

The relationship component 112 defines a relationship between the preferred channel list 118 maintained by the history component 110 and the plurality of available channels. The relationship may be predefined (e.g., by an original equipment manufacturer of the computing device 102 or by the user 120) or defined dynamically. In an embodiment, the relationship corresponds to a scan ratio 122 for intermixing intervals of preferred or selected channels to scan with intervals of all available channels to scan. The scan ratio 122 represents a frequency of scanning channels from the preferred channel list 118 relative to a frequency of scanning all the available channels. A preferred channel scan represents, for example, a scan of only the channels in the preferred channel list 118. A normal scan represents a scan of all the available channels. For example, the scan ratio 122 corresponds to a ratio of the quantity of scans of the channels on the preferred channel list 118 versus a quantity of normal scans (e.g., all the available channels). A scan ratio 122 of 2:1, for example, means that the computing device 102 performs two preferred channel scans for every one normal scan. A scan ratio 122 of zero means that all scans are normal scans.

In an embodiment, the relationship component 112 defines the scan ratio 122 in part based on a frequency of connection on each of the channels. For example, if the computing device 102 connects to the network 106 on one channel more frequently than other channels, the scan ratio 122 and/or preferred channel list 118 may be adjusted to scan the high-frequency channel more often than the other channels. For example, the scan ratio 122 may be adjusted so that the preferred channel list 118 is scanned more frequently and/or the preferred channel list 118 may be reduced to include the high-frequency channel and just one or two other channels. In some embodiments, the user 120 explicitly defines the scan ratio 122. In some embodiments the user 120 also explicitly sets the preferred channel list 118.

The driver component 114 instructs a network adapter or other communication interface 124 to scan the plurality of available channels based on the scan ratio 122 defined by the relationship component 112 to identify one of the plurality of channels on which to establish a connection. For example, depending on the scan ratio 122 defined by the relationship component 112, only the preferred channels are scanned instead of scanning all the available channels. In other embodiments, the network adapter scans a mix of preferred channels and other channels, dependent on the defined scan ratio 122.

In some embodiments, the feedback component 116 dynamically adjusts the scan ratio 122 defined by the relationship component 112 as a function of a characteristic of the computing device 102 to alter power consumption by the computing device 102. Dynamically calculating the scan ratio 122 may help to maximize the savings on power consumption. Exemplary characteristics of the computing device 102 comprise various operating parameters such as a battery power level, a battery type, a signal strength, a processing load on the computing device 102, a memory capacity of the computing device 102, user activity, system power state, location data, and quantity of channels in the preferred channel list 118. Alternatively or in addition, the scan ratio 122 is dependent on other factors. In an example, the scan ratio 122 is dependent on the type of network 106 to which the computing device 102 connects (e.g., different network protocols, bandwidth, error handling, etc.). In an embodiment, low battery level and low user activity on the device results in a higher scan ratio 122 and thereby increased power savings. Conversely, when user activity level is high, the scan ratio 122 is adjusted lower to benefit faster connectivity and improved user experience. Similarly, if the number of channels in the preferred channel list 118 is high, the scan ratio 122 will be adjusted higher to provide better power savings without compromising connectivity experience. Other factors, characteristics, and operating parameters are within the scope of aspects of the invention.

In some embodiments, the components are executed by the computing device 102 while the computing device 102 is mobile (e.g., to determine coverage). In other embodiments, the computing device 102 executes the components while the computing device 102 is connected to a network.

In an embodiment (not shown), the memory area 108 and the processor 109 are associated with a network adapter. In such an embodiment, aspects of the invention are implemented on the network adapter.

Figure 2:
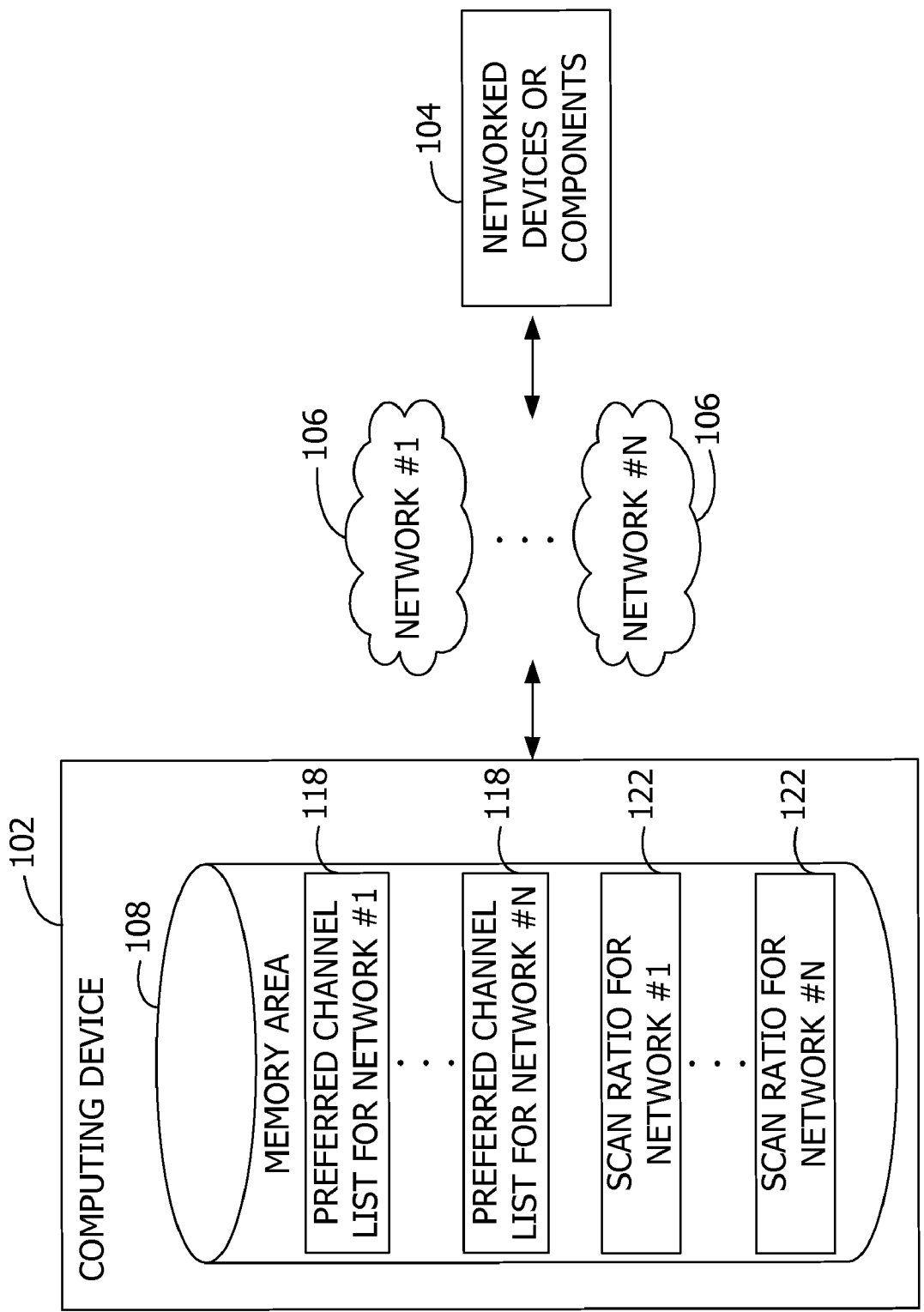
FIG. 2 is an exemplary block diagram illustrating a computing device having separate preferred channel lists and scan ratios for each of a plurality of networks.

Referring next to FIG. 2, an exemplary block diagram illustrates the computing device 102 having separate preferred channel lists 118 and scan ratios 122 for each network 106. There is a plurality of networks 106 such as network #1 through network #N in the example of FIG. 2, wherein N is a positive integer. The memory area 108 associated with the computing device 102 stores a plurality of the preferred channel lists 118 such as preferred channel list for network #1 through preferred channel list for network #N, and a plurality of scan ratios 122 such as scan ratio for network #1 through scan ratio for network #N. The scan ratios 122 may be stored in user-configurable portions of the memory area 108, or may be stored in portions of the memory area 108 that are not directly accessible by the user 120. In some embodiments (not shown), one of the preferred channel lists 118 is applicable to a plurality of the networks 106. In some embodiments, one of the scan ratios 122 is applicable to a plurality of the networks 106.

Figure 3:
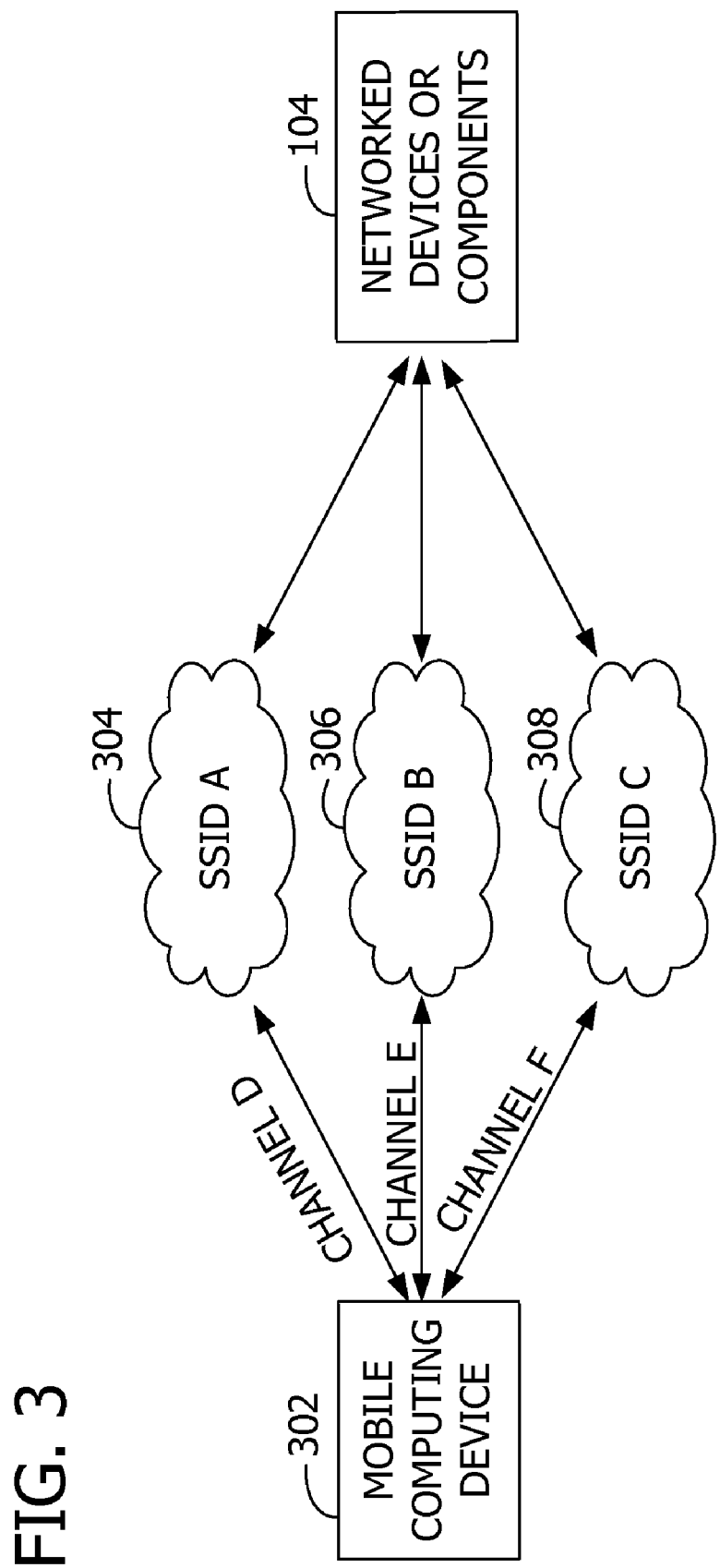
FIG. 3 is an exemplary block diagram of a mobile computing device connecting to a plurality of wireless networks.

Referring next to FIG. 3, an exemplary block diagram illustrates a mobile computing device 302 and connections to a plurality of wireless networks. The wireless networks include, for example, BLUETOOTH brand networks and 802.11 style networks. Aspects of the invention, however, are operable with any type of networks. In an example in which the networks operate in compliance with IEEE 802.11 standards for wireless networking, each of the wireless networks has a plurality of access points (e.g., channels) and has a service set identifier (SSID) that identifies the network. In the example of FIG. 3, the mobile computing device 302 receives broadcast messages (e.g., beacon signals) from each of the wireless networks within range. The networks have the following SSIDs: SSID A 304, SSID B 306, and SSID C 308. The broadcast messages advertise the SSID of the network to enable the mobile computing device 302 to connect.

In the example of FIG. 3, the mobile computing device 302 has previously connected to SSID A 304 using channel D, SSID B 306 using channel E, and SSID C 308 using channel F. The mobile computing device 302 stores each of the channels D, E, and F in the preferred channel list 118 for the corresponding network. Because of the previous connections, the channels D, E, and F represent the channels that have a higher likelihood of subsequently hosting each of the corresponding SSIDs. Upon subsequent attempts to connect, the mobile computing device 302 employs the scan ratios 122 and the preferred channel lists 118 to efficiently locate an access point and establish a connection. In some embodiments only a single preferred channel list 118 and scan ratio 122 is maintained.

In another example, as the mobile computing device 302 connects to different access points within a SSID, the mobile computing device 302 keeps track of the channels to which it connects. In an embodiment, for each of the top three (e.g., or more or less) of its preferred SSIDs, the mobile computing device 302 keeps track of the last two (e.g., or more or less) channels that it connected on as shown in Table 1 below.

TABLE 1

Example List of Preferred Channels per SSID.

| Preferred SSID | Preferred Channels |
|---|---|
| SSID A | 1, 3, 5 |
| SSID B | 4, 6 |
| SSID C | 3, 6, 1 |

The mobile computing device 302 then forms a union of these channels and stores the list as the preferred channel list 118. In the example in Table 1, the preferred channel list 118 is {1,3,4,5,6}. There are five preferred channels in this exemplary list. A single scan ratio 122 may also be assigned.

Figure 4:
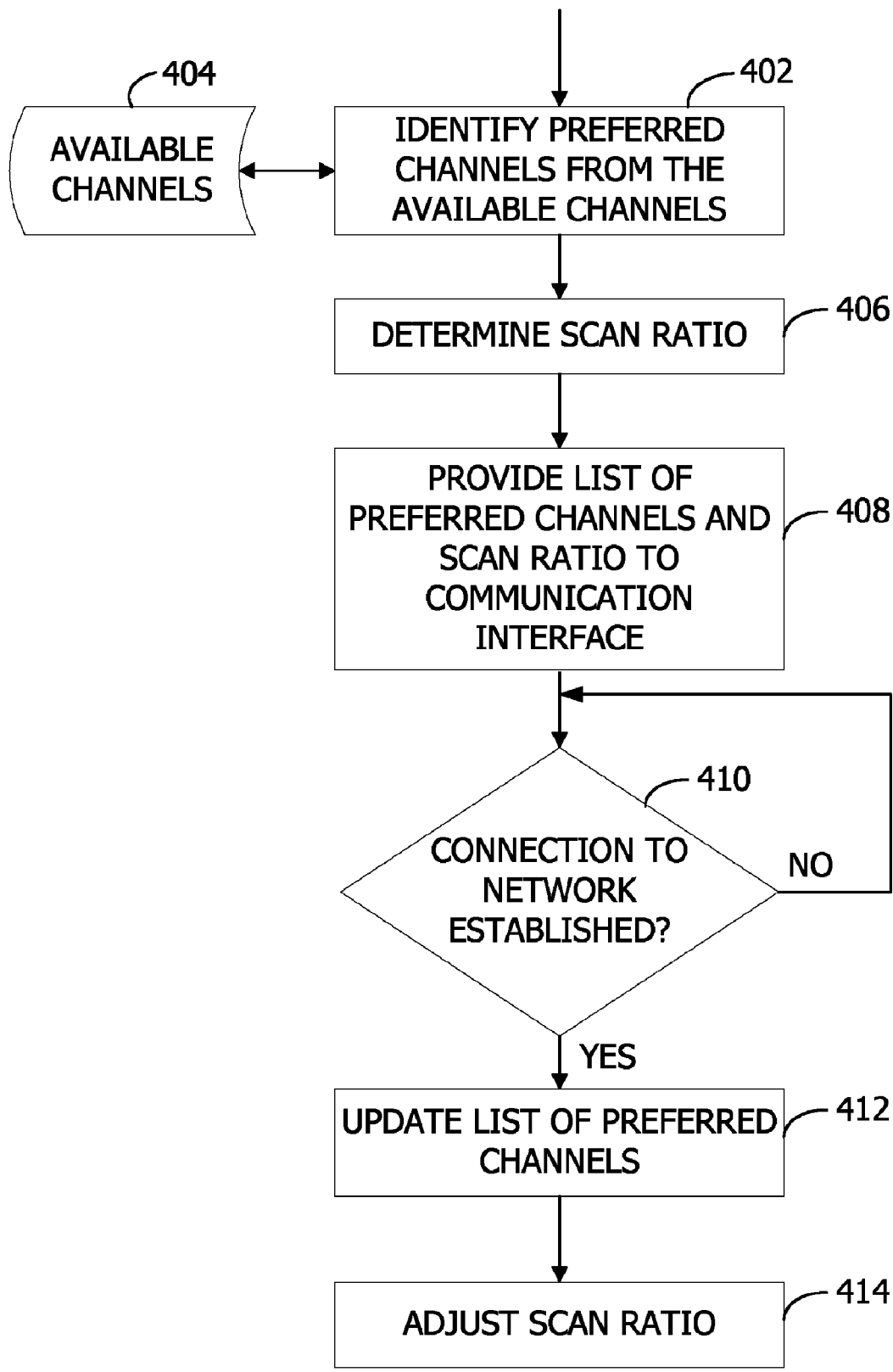
FIG. 4 is an exemplary flow chart illustrating creation and use of a preferred channel list for scanning for available networks.

Referring next to FIG. 4, an exemplary flow chart illustrates creation and use of the preferred channel list 118 for scanning for available networks 106. At 402, the computing device 102 identifies a plurality of channels from a list of channels available at 404 for communication over the network 106. The identified plurality of channels corresponds to the preferred channel list 118. In an embodiment, the available channels are divided into a first group representing the preferred channel list 118 and a second group representing all the available channels.

The scan ratio 122 is determined at 406. The scan ratio 122 generally corresponds to any relationship between the first group of channels and the second group of channels. For example, the scan ratio 122 corresponds to a ratio of the quantity of scans to perform with the channels from the first group relative to the quantity of scans to perform with the channels from the second group. The scan ratio 122 may also indicate that only channels from one of the particular groups should be scanned. For example, to save battery power, the computing device 102 may only want to perform a short, limited scan of the channels on the preferred channel list 118 at each interval. The scan ratio 122 may also be a function of the user 120 of the computing device 102. For example, the user 120 may specify (e.g., as a preference or profile in a configuration database) to conserve battery power by only searching channels on the preferred channel list 118 at each interval. The user 120 may alternatively alter the preferred channel list 118 and/or the scan ratio 122 to keep unconnected time to a minimum.

The preferred channel list 118 and the determined scan ratio 122 are provided at 408 to the communication interface 124 (e.g., a network adapter) of the computing device 102. The communication interface 124 performs scans in accordance with the preferred channel list 118 and the defined scan ratio 122 to establish a connection. For example, the communication interface 124 creates a scan list of all the channels from the first group for a first interval, all the channels from the second group for a second interval, and so on in accordance with the scan ratio 122. In an embodiment, the communication interface 124 automatically intermixes scans from the first group and from the second group based on the scan ratio 122. The communication interface 124 then performs a scan using the scan list by, for example, scanning the channels in the order they appear in the scan list. Alternatively, the computing device 102 creates the scan list and provides the scan list to the communication interface 124 rather than providing the preferred channel list 118 and the scan ratio 122. In another embodiment, there are more than two groups of channels and more than one scan ratio 122 that determines the relationship between the different groups.

When the connection is established at 410, the computing device 102 updates the preferred channel list 118 at 412 (e.g., adds the currently connected channel to the preferred channel list 118). Alternatively or in addition, the scan ratio 122 is adjusted at 414 based on the current connection. For example, the computing device 102 may adjust the scan ratio 122 based on the amount of battery power remaining for the computing device 102. As the battery power level decreases, the scan ratio 122 is adjusted to perform shorter scans (e.g., perform scans of channels from the preferred channel list 118 more frequently than scans of all the channels). The computing device 102 may also or alternatively instruct the communication interface 124 to perform scans less frequently (e.g., longer intervals) to further reduce power consumption. If the computing device 102 is connected to an electrical outlet, the computing device 102 may instruct the communication interface 124 to scan all the available channels at each interval to minimize the time spent unconnected to the network 106.

Figure 5:
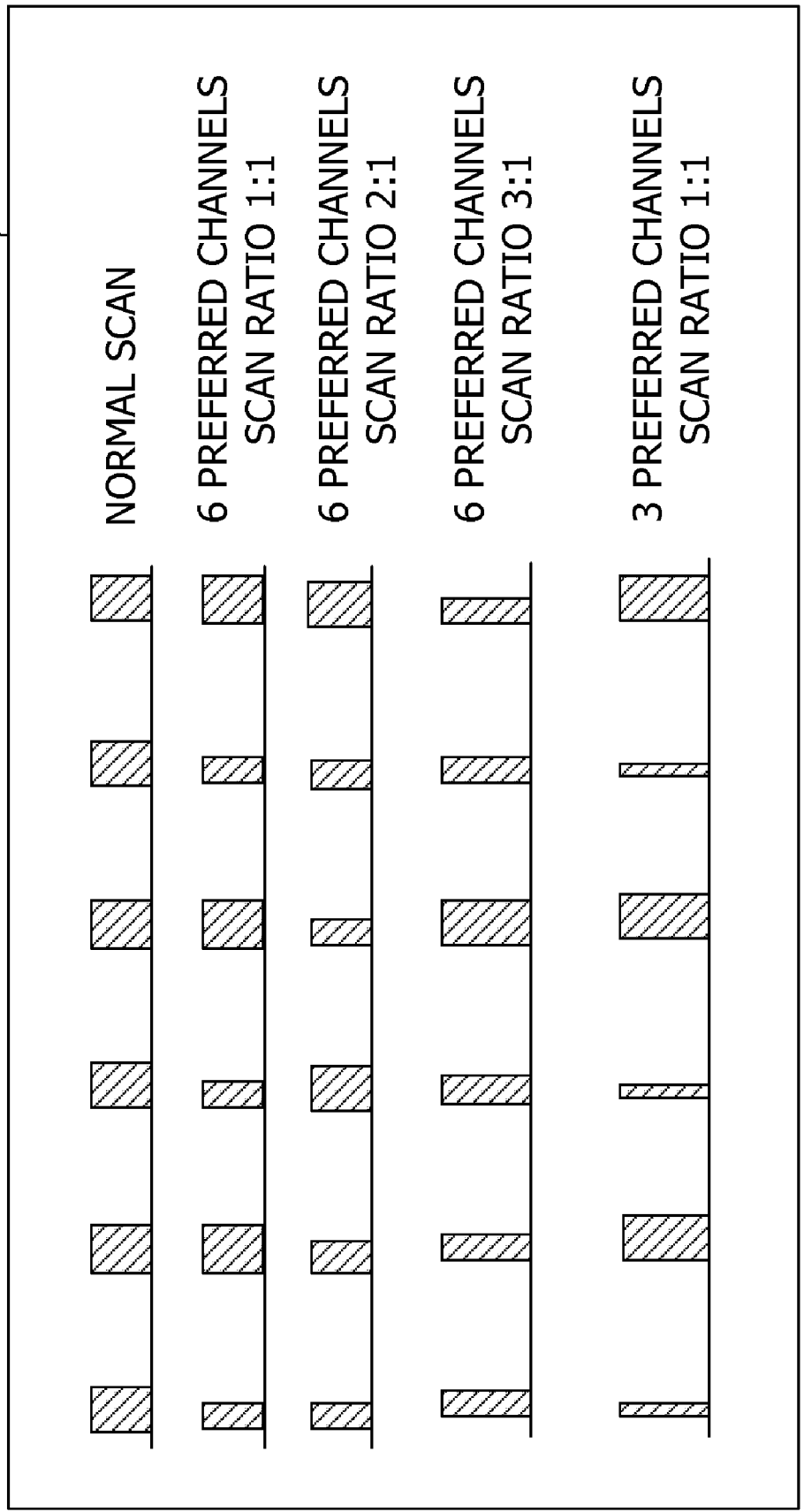
FIG. 5 is an exemplary block diagram illustrating various scan ratios.

Referring next to FIG. 5, an exemplary block diagram 502 illustrates various scan ratio 122 and quantities of channels in the preferred channel list 118. A larger volume of the blocks in each line corresponds to greater power consumption by the computing device 102 to perform the scan. The diagram 502 illustrates an exemplary relationship between scans of preferred channels and a normal scan of all available channels. In the normal scan, all available channels are scanned at each interval. In an embodiment, the interval is one minute. The examples below illustrate the impact of preferred channel scanning on unconnected standby time and connected battery life.

In an example in which the computing device 102 is capable of wireless fidelity (Wi-Fi), the system current in milliamps (mA) during a scan (e.g., the receive current) is 200 mA. The system current during the interval between scans (e.g., the idle current) is 1.2 mA. The listen interval per channel in milliseconds is 60 ms. Eleven channels are available for scanning. The theoretical average current is calculated in some embodiments as shown in Equation (1) below.

$$I_{avg}=(I_{receive} \times t_{receive}+I_{idle} \times t_{idle})/(t_{receive}+t_{idle}) \quad (1)$$

In Equation (1), $I_{receive}$ is the receive current, $I_{idle}$ is the idle current, $t_{receive}$ is the total listen time during an all channel scan, and $t_{idle}$ is the total idle time during an all channel scan. Using the values in this example, Equation (2) shows the theoretical average current.

$$I_{avg}=(200 \text{ mA} \times 0.66 \text{ s}+1.2 \text{ mA} \times 59.34 \text{ s})/(0.66 \text{ s}+59.34 \text{ s})=3.4 \text{ mA} \quad (2)$$

Thus, for normal scanning of all available channels, the theoretical average current is 3.4 mA as shown in Equation (2). For a 1000 mA-h battery, this value is equivalent to 1000/3.4=295 hrs of unconnected standby time.

Another line shows a scan of six preferred channels with a 1:1 scan ratio. The average current calculation is shown in Equation (3) below.

$$I_{avg}=(S^*(I_{receive}*N*t_{listen}+I_{idle}*t_{pref\_idle})+(I_{receive}*t_{receive}+I_{idle}*t_{idle}))/((S+1)*(t_{receive}+t_{idle})) \quad (3)$$

In Equation (3), N is the quantity of channels in the preferred channel list 118, S is the scan ratio, $I_{receive}$ is the receive current, $I_{idle}$ is the idle current, $t_{listen}$ is the listen interval, $t_{pref\_idle}$ is the idle time during preferred scan, $t_{receive}$ is the total listen time during all channel scan, and $t_{idle}$ is the total idle time during all channel scan. Using values from the above example and a scan ratio of 1, Equation (4) shows the theoretical average current.

$$I_{avg}=(1*(200 \text{ mA}*6*0.06 \text{ s}+1.2 \text{ mA}*59.64 \text{ s})+(200 \text{ mA}*0.66 \text{ s}+1.2 \text{ mA}*59.34 \text{ s})/(2*(0.66+59.34))=2.89 \text{ mA} \quad (4)$$

Thus, the theoretical average current for a scan ratio of 1 is 2.89 mA. For a 1000 mA-h battery, this is equivalent to 1000/2.89=346 hrs of unconnected standby time. Battery life has improved by 17% relative to normal scanning.

Another line in diagram 502 shows a scan of six preferred channels with a 3:1 scan ratio. In this example, there are three preferred channel scans every one minute followed by one normal scan. Using calculations similar to the above equations, the average current is 2.6 mA. Unconnected standby time is up 28% from the original.

Another line shows a scan of three preferred channels with a 1:1 scan ratio. Using calculations similar to the above equations, the average current is 2.59 mA and about 386 hrs of unconnected standby time. Battery life is up 45% from the original.

Figure 6:
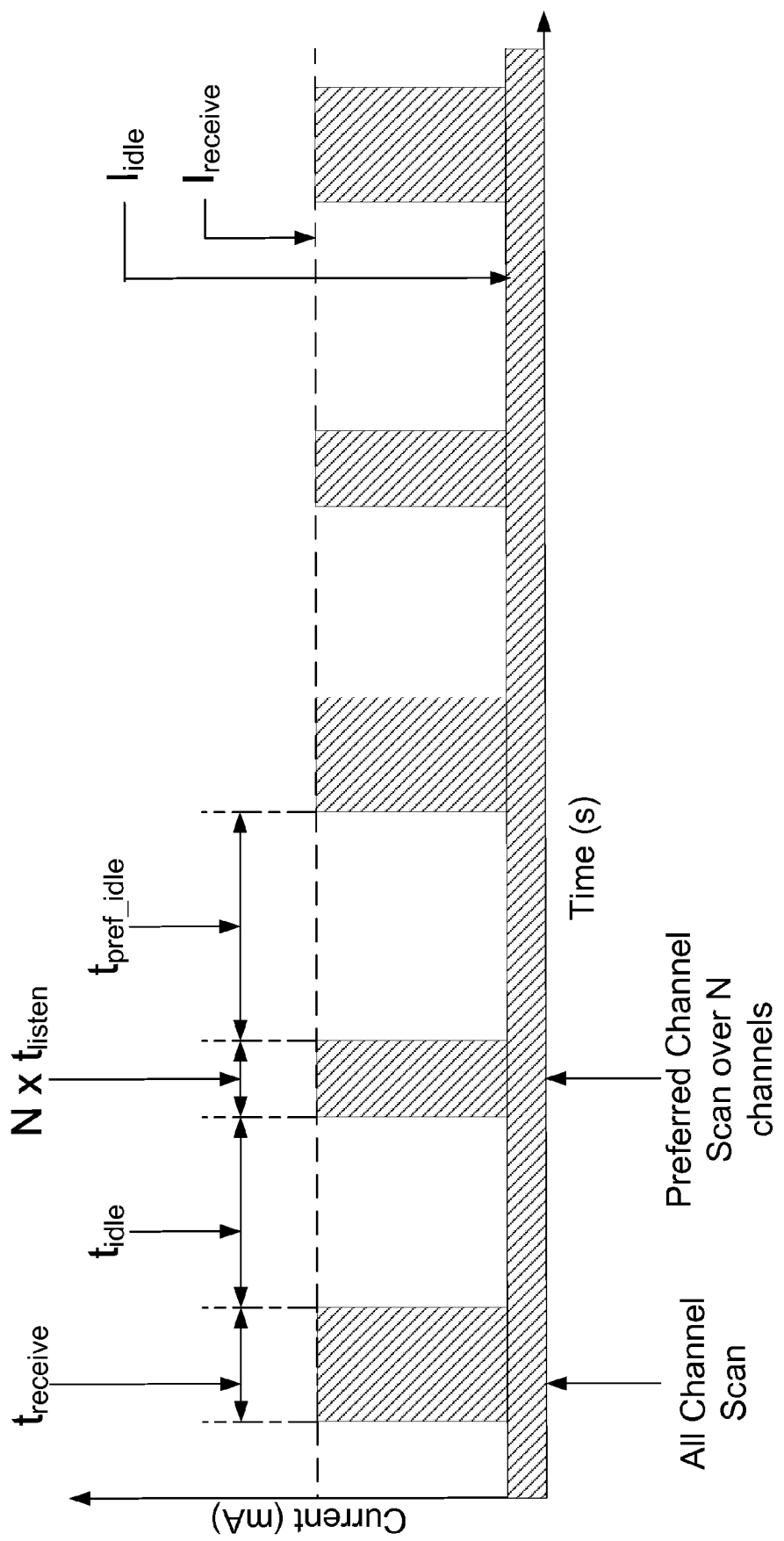
FIG. 6 is an exemplary block diagram illustrating various time intervals during scanning.

Referring next to FIG. 6, an exemplary timeline illustrates the terms used in Equations (1), (2), (3), and (4). In the example of FIG. 6, the scan ratio S is equal to 1 (e.g., one preferred channel scan for every normal scan).

Figure 7:
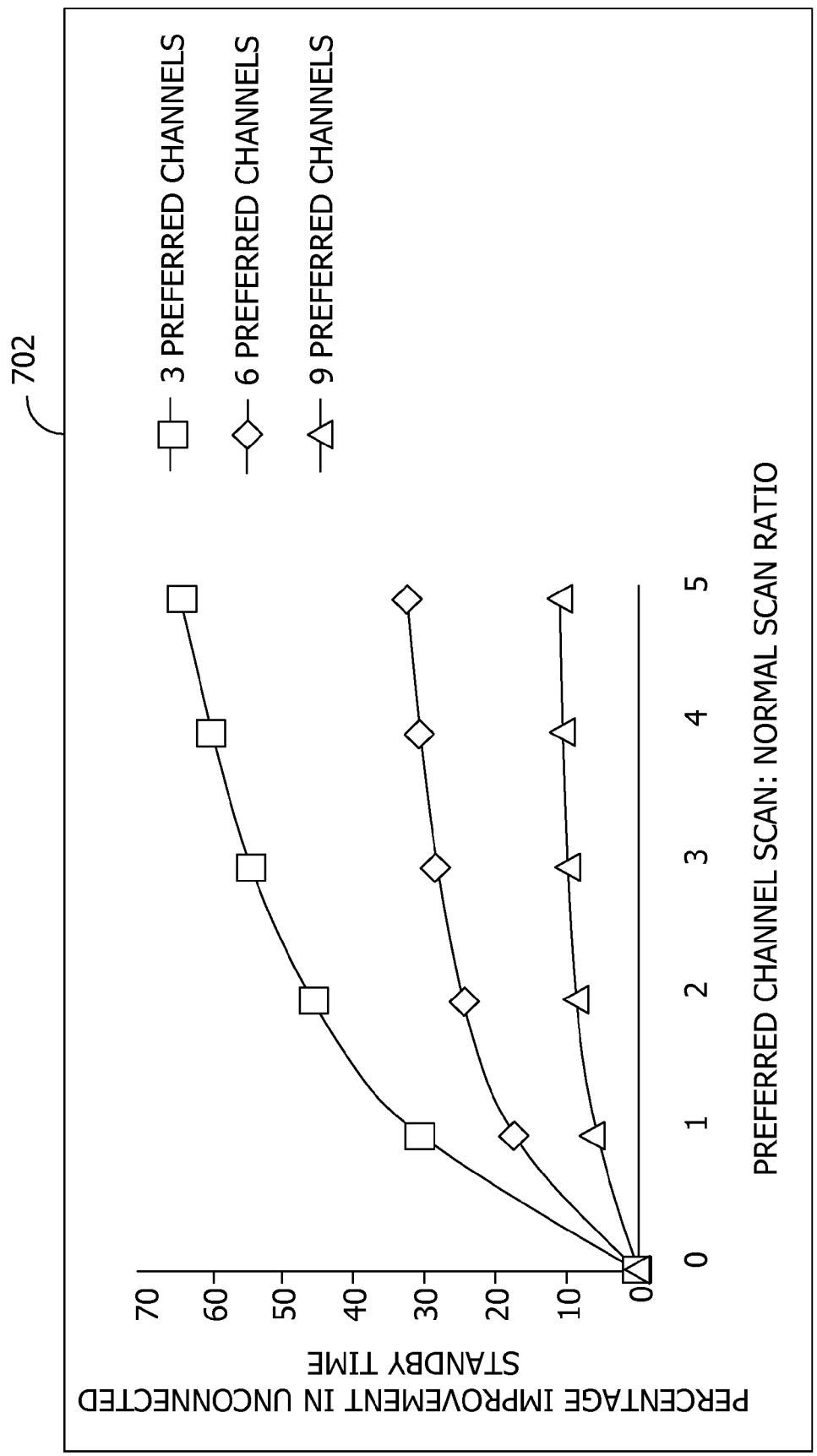
FIG. 7 is an exemplary chart showing connection time improvement as a function of the scan ratio.

Referring next to FIG. 7, an exemplary chart 702 shows connection time improvement as a function of the scan ratio 122 relative to the quantity of preferred channels. The chart 702 shows different cases for three, six, and nine channels in the preferred channel list 118. The chart 702 tracks battery life improvement vs. scan ratios 122. Even with as many as nine preferred channels in the list, an improvement of more than ten percent in unconnected standby time is possible. Generally, as the quantity of channels in the preferred channel list 118 decreases, the percentage improvement in unconnected standby time increases.

Figure 8:
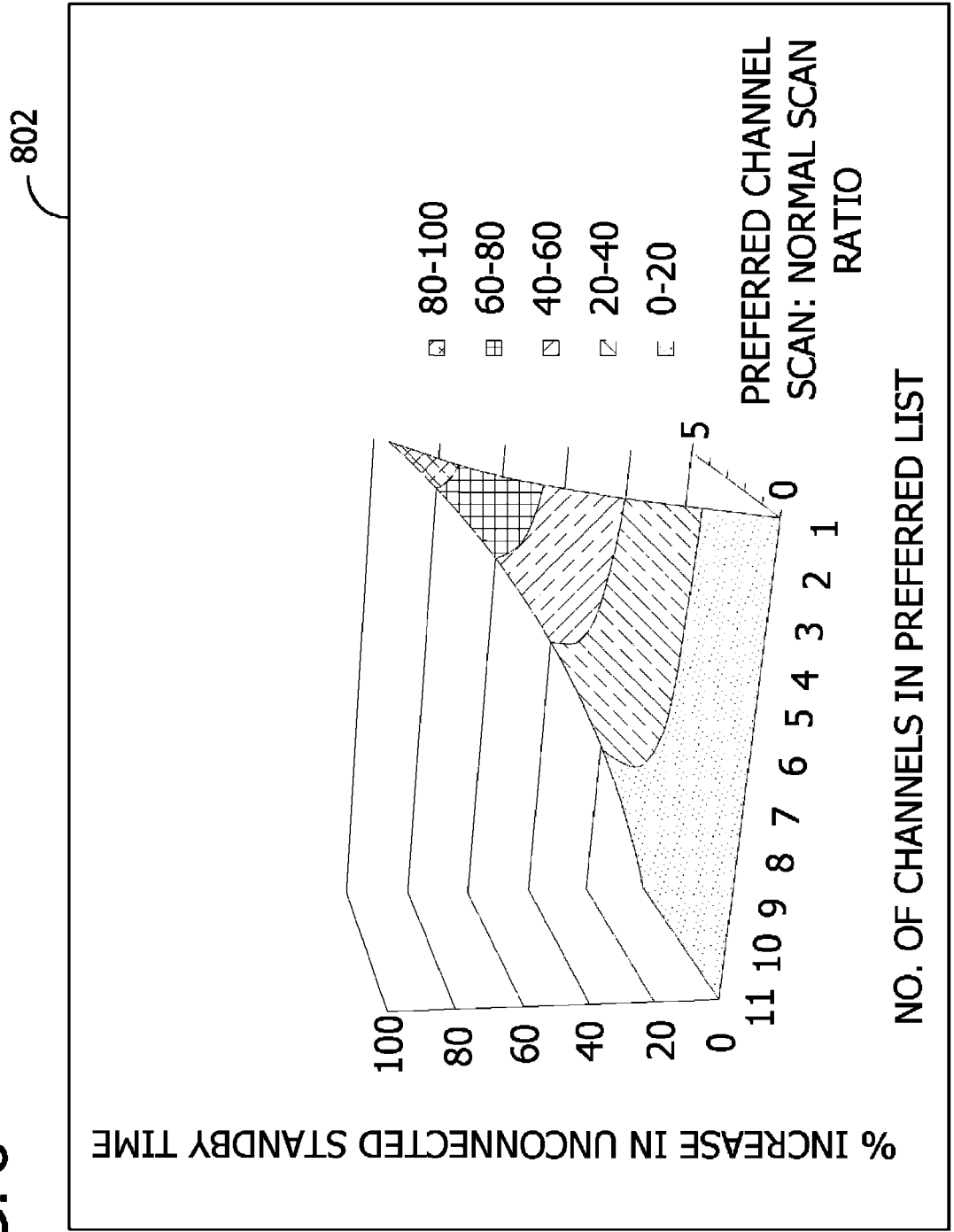
FIG. 8 is an exemplary chart showing the impact of preferred channel scanning on battery life of a computing device.

Referring next to FIG. 8, an exemplary chart 802 shows the impact of preferred channel scanning on battery life of a computing device such as computing device 102. The chart 802 shows variations in battery life with the quantity of channels in the preferred channel list 118 and scan ratios 122. Generally, the greatest increases in unconnected standby time occur when there is a minimal quantity of channels on the preferred channel list 118 and there is a high scan ratio 122 between scans of preferred channels to all available channels.

Exemplary Operating Environment

The computing device 102 typically has at least some form of computer readable media. Computer readable media, which include both volatile and nonvolatile media, removable and non-removable media, may be any available medium that may be accessed by the computing device 102. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, radio frequency, infrared, and other wireless media, are examples of communication media. Combinations of any of the above are also included within the scope of computer readable media.

The computing device 102 may operate in a networked environment using logical connections to one or more remote computers, such as a remote computer.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

The embodiments illustrated and described herein as well as embodiments not specifically described herein but within the scope of aspects of the invention constitute exemplary means for defining the scan ratio 122, exemplary means for performing maintenance on the list of preferred channels, and exemplary means for managing power consumption by the mobile computing device 302 by altering the scanning of channels for network connection.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. One or more tangible computer storage media having computer-executable components for intelligently scanning a plurality of channels for connection by a mobile computing device over a network, said components comprising: a history component for maintaining a list of channels on which the mobile computing device connects to a network, said list of channels representing a subset of a plurality of channels available for connection; a relationship component for defining a ratio between scans of the list of channels maintained by the history component and scans of the plurality of channels; a driver component for instructing a network adapter to scan the plurality of channels based on the ratio defined by the relationship component to identify one of the plurality of channels on which to establish a connection; and a feedback component for dynamically adjusting the ratio defined by the relationship component as a function of a memory capacity of the mobile computing device to alter power consumption by the mobile computing device.

2. The computer storage media of claim 1, wherein the relationship component determines a scan ratio representing a quantity of scans of channels from the list of channels relative to a quantity of scans of channels from the plurality of channels.

3. The computer storage media of claim 1, wherein the feedback component further dynamically adjusts the ratio as a function of a battery power level of the mobile computing device.

4. The computer storage media of claim 1, wherein the history component maintains the list of channels by tracking the channels to which the mobile computing device connects over time.

5. The computer storage media of claim 1, wherein the history component maintains a frequency of connection on each of the channels, and wherein the relationship component defines the ratio based on the frequency maintained by the history component.

6. The computer storage media of claim 1, wherein the history component removes a channel from the list of channels after a period of inactivity on the channel.

7. A system for communicating via a plurality of channels, said system comprising:
a memory area for storing a list of preferred channels for each of a plurality of networks, said list of preferred channels being for communication by a computing device over the plurality of networks, said list of preferred channels representing a subset of the plurality of channels, said memory area further storing a scan ratio between a quantity of scans of the preferred channels and a quantity of scans of the plurality of channels for each of the plurality of networks; and
a processor configured to execute computer-executable instructions for:
identifying one or more of the plurality of channels as the list of preferred channels for one of the plurality of networks;
defining a relationship between the identified preferred channels and the plurality of channels as the scan ratio for said one of the plurality of networks;
commanding a network adapter associated with the computing device to scan, based on the scan ratio for said one of the plurality of networks, the plurality of channels to establish connections to said one of the plurality of networks;
performing maintenance on the list of preferred channels over time as the computing device establishes the connections; and
dynamically adjusting the scan ratio stored in the memory area as a function of an amount of battery life remaining for the computing device.

8. The system of claim 7, wherein the processor is further configured to execute computer-executable instructions for:
receiving data from a user of the computing device; and
adjusting the scan ratio stored in the memory area as a function of the received data.

9. The system of claim 7, wherein the processor is further configured to execute computer-executable instructions for defining the relationship as a function of a type of said one of the plurality of networks.

10. The system of claim 7, wherein the scan ratio is stored in a user-configurable area of the memory area.

11. The system of claim 7, further comprising:
means for defining the scan ratio; and
means for performing maintenance on the list of preferred channels.

12. A method comprising:
identifying a plurality of channels for communication by a computing device over a network;
assigning a subset of the plurality of channels to a first group, wherein the plurality of channels defines a second group;
defining a scan ratio between the first group and the second group, said scan ratio representing a quantity of scans of channels from the first group relative to a quantity of scans of channels from the second group;
determining an amount of battery life remaining for the computing device;
adjusting the defined scan ratio as a function of the determined amount of battery life remaining for the computing device; and
providing the adjusted, defined scan ratio to a communication interface, wherein the communication interface performs scans in accordance with the adjusted, defined scan ratio to establish a connection.

13. The method of claim 12, further comprising:
creating a scan list by selecting channels from the first group and from the second group in accordance with the defined scan ratio; and
providing the created scan list to the communication interface, wherein the communication interface scans the channels in the scan list in the order that the channels appear in the scan list.

14. The method of claim 12, wherein the communication interface selects channels from the first group and from the second group based on the scan ratio to determine a scan list.

15. The method of claim 12, wherein defining the scan ratio comprises defining the scan ratio based on one or more of the following: an activity of a user of the computing device, and a network location of the computing device.

16. The method of claim 12, further comprising reducing a frequency of scanning based on the determined amount of battery life remaining for the computing device.

17. The method of claim 12, further comprising instructing the communication interface to scan channels from either the first group or the second group based on the defined scan ratio.

* * * * *